United States Patent Office 3,168,218
Patented Feb. 2, 1965

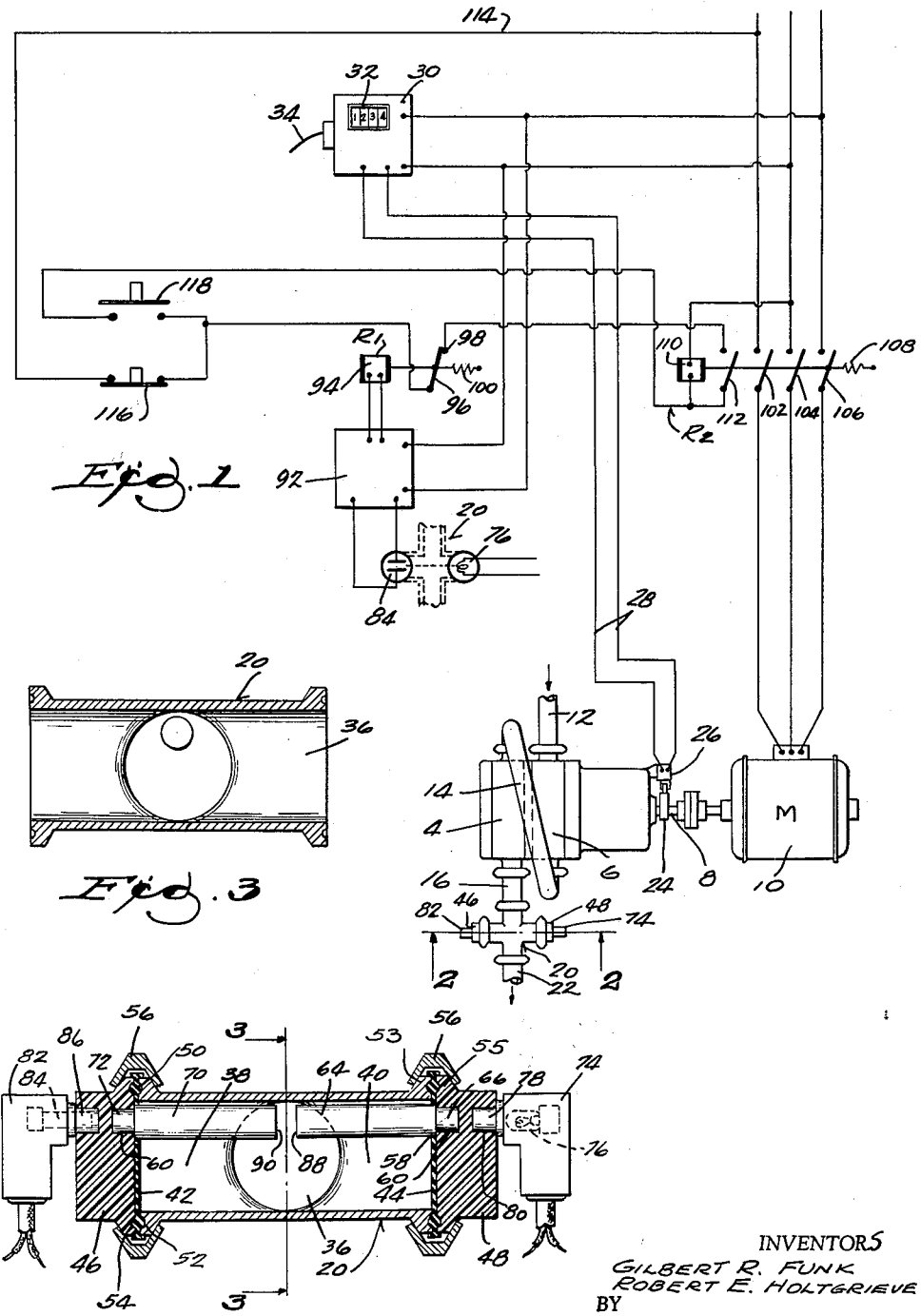

3,168,218
METERING DEVICE WITH OPAQUENESS RESPONSIVE SHUTOFF
Gilbert R. Funk and Robert E. Holtgrieve, Waukesha, Wis., assignors to Waukesha Foundry Company, Waukesha, Wis., a corporation of Wisconsin
Filed Sept. 18, 1962, Ser. No. 224,356
10 Claims. (Cl. 222—23)

This invention relates to a metering device with automatic shutoff.

The invention has particular reference to a metering pump for opaque or semi-opaque liquids and it is an objective of the invention to shut off the pump whenever the flow of liquids ceases to be a solid flow, i.e., completely liquid with substantially no entrained gas bubbles.

Within the generic concept as above stated, the invention is devised for specific use in connection with a metering pump wherein the output is directly related to the number of rotations of the pump shaft. A pulsing switch operated by a cam on the pump driving shaft actuates a pulse-responsive register which totalizes the volume of liquid pumped. If the pump is not delivering a solid flow of liquid, the register will not record correctly the volume of liquid pumped. The present invention includes a photoelectric cell and light source which are so positioned at opposite sides of the flow of liquid discharged by the pump and so connected to relays controlling the pump operation that the passage of even a single bubble may be made to interrupt pump operation instantly.

In the disclosed embodiment, a special fitting through which the pump discharge flow passes provides aligned transparent rods respectively leading from a light source and to a photoelectric cell, the rods being adjustable to control the spacing between their ends accordingly to the opacity of the liquid pumped, thereby giving very precise control of the relay which shuts off the pump if a bubble passes between the spaced ends of the rods.

The invention is not limited to use in a metering pump organization, but it has particular utility in this field. The specific exemplification here illustrated is especially designed for a metering pump such as may be used to measure the discharge of milk from a tank truck into the storage facilities of a dairy. Some of the details of the disclosure have specific reference to this usage.

In the drawings:

FIG. 1 is a diagram of an illustration embodying the invention.

FIG. 2 is an enlarged detail view taken in cross section on the line 2—2 of FIG. 1.

FIG. 3 is a view taken in cross section on the line 3—3 of FIG. 2.

The metering pump illustrated is shown in detail in my copending application for patent entitled "Metering Pump," No. 5,507, filed January 29, 1960. It includes connected casings 4 and 6 in which there are pump rotors (not here shown) driven by shaft 8 from pump motor 10. The liquid to be pumped enters casing 6 from supply pipe 12. From the outlet of casing 6 the liquid passes through the pipe 14 to the inlet of casing 4, from which outlet pipe 16 leads to the scanning head 20 and thence to the discharge pipe 22.

Desirably the liquid displacement capacity of one of the series-connected pumps is greater than that of the other and the excess flow is bypassed as suggested in the patent to Pool 1,477,850, December 18, 1923, so that substantially equal pressures are maintained at all times at the inlet and outlet 14 and 16 of the metering pump element. Since this pump element is thereby wholly relieved of head pressure, the discharge will always be exactly proportionate to the number of revolutions of the drive shaft 8, as long as solid flow through the metering pump is maintained. Consequently a means for counting shaft rotations can be calibrated in terms of the volume of liquid pumped.

The cam 24 on the shaft 8 closes the impulse-generating switch 26 once in every rotation of the shaft. The impulses thus generated are conducted electrically by conductors 28 to an impulse-responsive register 30. Desirably, the register not only has totalizing dials but also issues a tape at 34 showing the total flow delivered by the pump.

Since the register will correctly indicate pump flow only as long as a solid stream of liquid is delivered, the scanning head 20 is devised to terminate pump operation in the event that the flow ceases to be solid. The scanning head 20 is cruciform as shown in FIG. 1. A through passage 36 provides communication between the pump outlet pipe 16 and the discharge pipe 22. The branch passages 38 and 40 are closed at their respective ends by packing webs 42 and 44 backed up by transparent blocks 46 and 48 which may be made of a transparent plastic material. For sealing purposes, each of the webs 42, 44 may be provided with an annular rib at 50 for which the lateral arms of the scanning head 20, and the opposed portions of the transparent blocks 46, 48 may be provided with registering grooves 52, 54. Beveled annular flanges 53, 55 of the type commonly used in sanitary equipment receive annular channeled clamping rings 56 for releasably connecting the closures to the lateral branches of the scanning head. Details of the operation of these clamps are not shown, such clamps being conventional.

In each closure the packing disk is apertured at 58 and the adjacent transparent block has a registering socket at 60. Seated in the aperture 58 of the packing 44 is a rod or cylinder 64 of transparent material such as glass or synthetic resin, the rod being shouldered to provide a reduced extremity at 66 engaged in the socket at 60 of the transparent block 48. In axial alignment with the rod 64 is a like rod 70 with a reduced extremity 72 in the socket 60 of the transparent closure block 46.

The lamp casing 74 contains a light source such as lamp bulb 76 which has its filament axially aligned with a transparent stud 78 fitted to the socket 80 of the transparent closure block 48 in alignment with the reduced end 66 of the transparent rod 64.

The photoelectric cell casing 82 contains a photocell 84 in registry with the transparent mounting stud 86 which is aligned with the reduced end 72 of the transparent rod 70. The term "photoelectric cell" is, of course, used generically to indicate any device which will respond to energy from an emitter 76 in the manner in which a photoelectric cell responds to light, it being understood that the energy will be of a nature such that it can be intercepted by the solid flow between the rods 64 and 70 of a liquid which is wholly or partially opaque to such energy.

For the purposes of the present invention, which is especially concerned with the detection of bubbles, the two transparent rods 64 and 70 are aligned near the top of the stream of liquid traversing the passage 36 in scanning head 20. The spacing between the ends 88 and 90 of the rods 64 and 70 can readily be varied according to the opacity of the liquid pumped and the sensitivity of response of the relays. Removal of the clamping rings 56 permits the respective heads including blocks 46, 48, and packing disks 42, 44 to be removed, not only for cleaning but to allow the respective rods 64 and 70 to be interchanged with rods both of which may be longer or shorter to increase the clearance or gap between the ends when the device is re-assembled.

In the circuit diagram of FIG. 1, the energy source 76 and the responsive device 84 are shown in relation to an amplifier housing 92 having connections to the solenoid 94 of relay R1 for opening the contactor 96 from its normally closed connection with the terminal 98 toward which it is biased by spring 100.

A relay R2 controls the pump motor 10. As shown, the pump motor is a three-phase motor having separate switch contactors 102, 104 and 106 normally biased to open circuit position by spring 108. Relay R2 has a solenoid 110 for closing the motor circuits and for closing a holding circuit through contactor 112.

Current for relays R1 and R2 is supplied by conductor 114 through a normally closed pushbutton switch 16 and the contactor 96 of relay R1. However, the current so supplied cannot reach the coil 110 of relay R2 unless the holding circuit is closed through previous energization of such coil by means of the normally open pushbutton switch 118. The energization of coil 110 achieved by pushbutton switch 118 starts the motor 10 and closes the holding circuit 112 which maintains relay R2 energized until its circuit is opened elsewhere either manually through switch 116 or electrically through the energization of relay R1. This energization occurs whenever light or other energy from the source at 76 reaches the responsive device 84 as a consequence of a reduction in opacity of the liquid traversing the scanning head. This may happen if the supply of liquid is completely interrupted or is momentarily interrupted, as by the passage of a bubble or bubbles.

We claim:

1. The combination with a flow meter for recording the flow of a liquid at least partially opaque, said meter having a shutoff device including a switch, and a fitting having a passage through which flow occurs, of a light source at one side of the passage, a light responsive device at the other side of the passage, light conductive rods on opposite sides of the passage and aligned with each other between the source and the responsive device and having their ends spaced within the passage to accommodate flow between such ends, and a circuit connecting the light responsive device with the switch and including means for actuating said shutoff device to interrupt flow through said passage whenever a bubble permits light to pass between said rods from the source to the responsive device.

2. A combination according to claim 1 in which the fitting is cruciform having lateral arms provided with sanitary couplings, and sealing means retained by said couplings and on which said rods are mounted.

3. The combination with a metering pump for opaque liquid and including a pumping rotor and means for making the pump output proportionate to the number of rotations of said rotor provided a solid flow of liquid is acted on thereby, means for counting the rotations of the rotor, and means responsive to the opaqueness of said liquid for terminating the operation of the pump in the event the flow therefrom ceases to be opaque.

4. A combination according to claim 3 in which said last mentioned means includes a fitting in operative connection with the pump for the passage through the fitting of the opaque liquid pumped, the fitting including a pair of spaced transparent members mounted on the fitting at opposite sides of the path of flow of a part of the opaque liquid pumped, light emitting and light responsive devices aligned with the respective members, the light responsive device being prevented from receiving light when opaque liquid intervenes between said members, and means whereby the reception of light by the light responsive member actuates the means for terminating the operation of the pump.

5. A combination according to claim 4 in which said fitting has a passage for the opaque liquid and said transparent members have spaced light transmitting portions disposed in an upper portion of said passage whereby a bubble in the liquid pumped will tend to pass between the said spaced portions of said transparent members.

6. A combination according to claim 4 in which said fitting is generally cruciform in horizontal plan having longitudinally opposite arms for the passage of the opaque liquid pumped and laterally opposite arms in which said members are disposed, the said members constituting bars extending from opposite sides of the fitting into the path of the liquid pumped and in alignment with each other between the light emitting and light responsive devices.

7. A combination according to claim 4 in which the fitting is generally cruciform in plan and has tubular arms communicating with each other at the center of the fitting and provided with beveled flanges constituting portions of sanitary couplings, two of said arms being lateral arms having closures with complementary beveled flanges encircled by sanitary coupling clamping means and constituting parts of said sanitary couplings, the transparent members aforesaid comprising light conducting bars mounted on the respective closures and projecting toward the center of the fitting.

8. In a device of the character described, a subcombination which comprises a generally cruciform fitting having a pair of longitudinally aligned tubular arms and a pair of transversely aligned tubular arms, sanitary couplings at the ends of the respective arms, closures for the transversely aligned arms anchored by the couplings to the respective transversely aligned arms, spaced transparent bars mounted on the respective closures and projecting toward the center of the fitting, the ends of the bars being mutually spaced in the path of flow between the longitudinally aligned arms of the fitting, and light emitting and light responsive devices respectively mounted on the said closures externally of the fitting in alignment with each other and with said bars.

9. A subcombination according to claim 8 in which the respective closures are transparent bodies having sockets in which the said bars and the said devices have complementary transparent mounting portions.

10. A subcombination according to claim 8 in which said fitting has upper and lower sides, the said bars being disposed nearer the upper side of the respective arms than the lower side thereof.

References Cited in the file of this patent

UNITED STATES PATENTS

| | | |
|---|---|---|
| 2,256,595 | Metcalf | Sept. 23, 1941 |
| 2,535,181 | Way | Dec. 26, 1950 |
| 2,892,378 | Canada | June 30, 1959 |
| 2,967,450 | Shields et al. | Jan. 10, 1961 |
| 3,055,551 | Johnson | Sept. 25, 1962 |